United States Patent
Szeppat et al.

(10) Patent No.: US 12,012,090 B2
(45) Date of Patent: Jun. 18, 2024

(54) METHOD FOR OPERATING A DUAL CLUTCH TRANSMISSION OF A MOTOR VEHICLE AND MOTOR VEHICLE

(71) Applicant: AUDI AG, Ingolstadt (DE)

(72) Inventors: Enrico Szeppat, Lunzenau OT Göritzhain (DE); Lutz Gundlach, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 42 days.

(21) Appl. No.: 17/798,159

(22) PCT Filed: Apr. 6, 2021

(86) PCT No.: PCT/EP2021/058878
§ 371 (c)(1),
(2) Date: Aug. 8, 2022

(87) PCT Pub. No.: WO2021/213795
PCT Pub. Date: Oct. 28, 2021

(65) Prior Publication Data
US 2023/0074183 A1    Mar. 9, 2023

(30) Foreign Application Priority Data

Apr. 20, 2020   (DE) .......................... 102020110610.6

(51) Int. Cl.
*B60W 20/30*    (2016.01)
*B60K 6/48*    (2007.10)
(Continued)

(52) U.S. Cl.
CPC .............. *B60W 20/30* (2013.01); *B60K 6/48* (2013.01); *B60W 10/02* (2013.01); *B60W 10/06* (2013.01);
(Continued)

(58) Field of Classification Search
CPC ...... B60W 320/30; B60W 6/48; B60W 10/02; B60W 10/06; B60W 10/08; B60W 10/113;
(Continued)

(56) References Cited

U.S. PATENT DOCUMENTS

| | | | |
|---|---|---|---|
| 7,082,850 B2* | 8/2006 | Hughes .................. | B60K 6/387 74/3 |
| 8,256,312 B2* | 9/2012 | Hatori .................. | F16H 61/688 74/330 |

(Continued)

FOREIGN PATENT DOCUMENTS

| | | |
|---|---|---|
| DE | 19950696 A1 | 4/2001 |
| DE | 102007019241 A1 | 10/2008 |

(Continued)

OTHER PUBLICATIONS

Examination Report issued on May 14, 2020, in corresponding German Application No. 10 2020 110 610.6; 10 pages.

(Continued)

*Primary Examiner* — Ha Dinh Ho
(74) *Attorney, Agent, or Firm* — Maier & Maier, PLLC

(57) ABSTRACT

A method for operating a dual clutch transmission of a motor vehicle having a first partial transmission, a second partial transmission, and a transmission output shaft common to the partial transmissions and drivable both by the first partial transmission and by the second partial transmission, in which the dual clutch transmission is in a parking lock state in which two gears of one of the partial transmissions are engaged simultaneously. The following steps are carried out to exit the parking lock state: Introducing a torque caused by a drive element of the motor vehicle via the transmission output shaft common to the one partial transmissions into the one and/or other partial transmission while the gears of the partial transmission are engaged; and disengaging at (Continued)

least one of the gears of the one partial transmission engaged simultaneously in step a).

20 Claims, 1 Drawing Sheet

(51) Int. Cl.
| | |
|---|---|
| *B60W 10/02* | (2006.01) |
| *B60W 10/06* | (2006.01) |
| *B60W 10/08* | (2006.01) |
| *B60W 10/113* | (2012.01) |
| *B60W 30/18* | (2012.01) |
| *F16H 59/44* | (2006.01) |
| *F16H 61/00* | (2006.01) |
| *F16H 61/20* | (2006.01) |
| *F16H 61/688* | (2006.01) |
| *F16H 59/66* | (2006.01) |

(52) U.S. Cl.
CPC .......... *B60W 10/08* (2013.01); *B60W 10/113* (2013.01); *B60W 30/18027* (2013.01); *B60W 30/18118* (2013.01); *F16H 61/0059* (2013.01); *F16H 61/20* (2013.01); *F16H 61/688* (2013.01); *B60K 2006/4816* (2013.01); *B60W 2710/021* (2013.01); *B60W 2710/06* (2013.01); *B60W 2710/083* (2013.01); *B60W 2710/1005* (2013.01); *B60Y 2200/92* (2013.01); *B60Y 2300/18025* (2013.01); *B60Y 2300/18116* (2013.01); *F16H 2059/446* (2013.01); *F16H 2059/663* (2013.01); *F16H 2061/205* (2013.01); *F16H 2200/0052* (2013.01); *F16H 2312/02* (2013.01); *F16H 2312/04* (2013.01)

(58) Field of Classification Search
CPC .... F16H 61/0059; F16H 61/20; F16H 61/688; F16H 2059/446; F16H 2059/663
USPC .......................................... 74/661, 330, 335
See application file for complete search history.

(56) References Cited

U.S. PATENT DOCUMENTS

| | | | |
|---|---|---|---|
| 8,768,588 B2* | 7/2014 | Hatori | F16H 61/0213 74/330 |
| 9,556,934 B2* | 1/2017 | Terashima | F16H 61/688 |
| 10,518,767 B2* | 12/2019 | Ruybal | B60W 10/06 |
| 2005/0229732 A1* | 10/2005 | Hara | F16H 3/006 74/325 |
| 2005/0284242 A1* | 12/2005 | Ogami | F16H 63/3408 74/325 |

FOREIGN PATENT DOCUMENTS

| | | |
|---|---|---|
| DE | 102008025516 A1 | 1/2009 |
| DE | 102010028026 A1 | 10/2011 |
| DE | 102017117079 A1 | 1/2019 |
| DE | 102017218798 A1 | 4/2019 |
| DE | 102018204571 A1 | 9/2019 |

OTHER PUBLICATIONS

International Preliminary Report on Patentability and Written Opinion issued on Oct. 25, 2022, in corresponding International Application No. PCT/EP2021/058878; 19 pages.
International Search Report issued on Jul. 15, 2021, in corresponding International Application No. PCT/EP2021/058878; 5 pages.

* cited by examiner

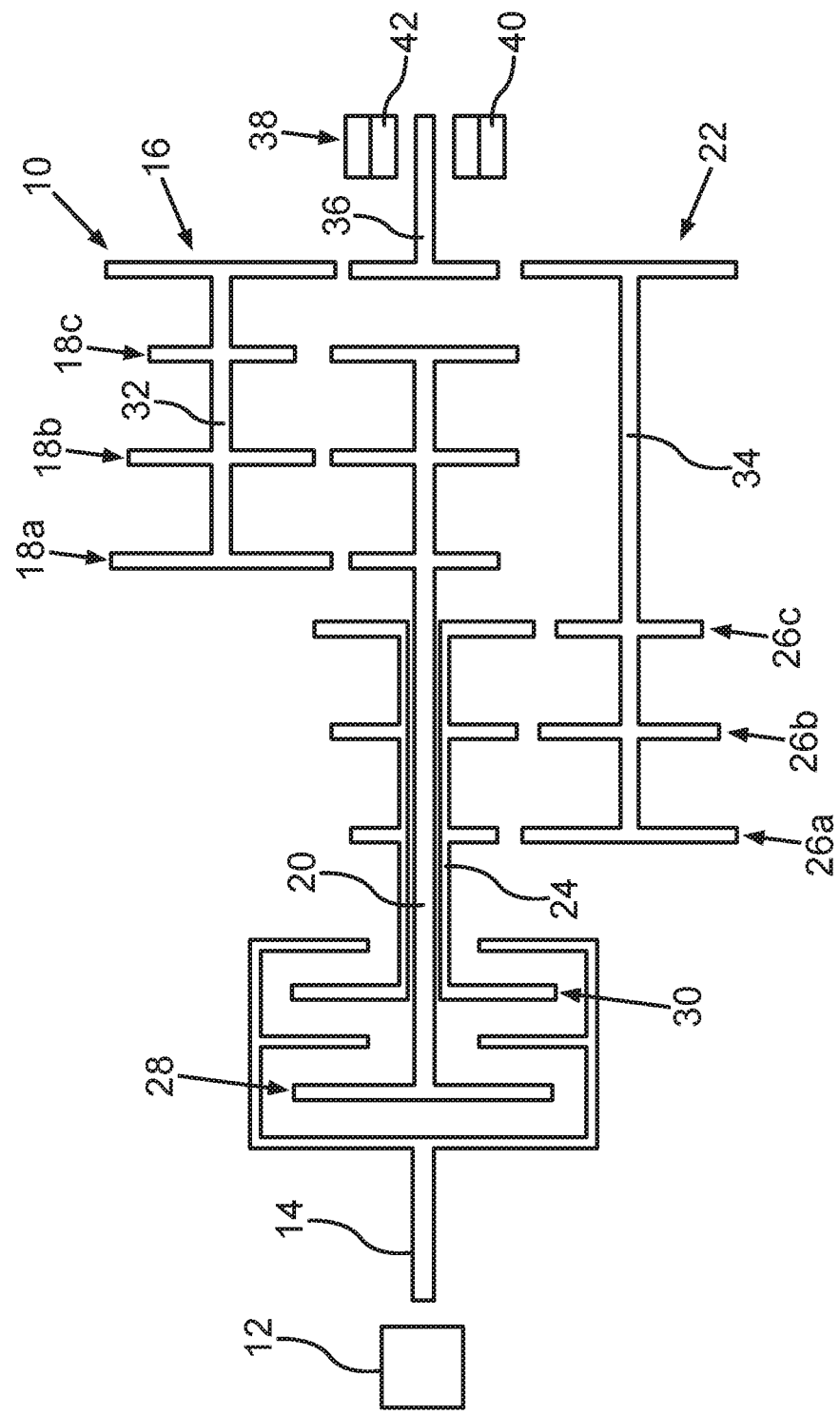

METHOD FOR OPERATING A DUAL CLUTCH TRANSMISSION OF A MOTOR VEHICLE AND MOTOR VEHICLE

FIELD

The invention relates to a method for operating a dual clutch transmission of a motor vehicle. In addition, the invention relates to a motor vehicle.

BACKGROUND

DE 10 2010 028 026 A1 discloses a method for operating a hybrid powertrain for a vehicle, with an internal combustion engine for internal combustion engine driving and several electric machines for electric driving and starting. In the method, at least one switchable active connection is established between the internal combustion engine and the partial transmissions of a gear transmission for traction-free driving. It is also envisaged that any switchable active connection between one of the partial transmissions and the internal combustion engine is established without slippage. Furthermore, to implement the parking lock function, a gear step shift element associated with an even gear step can be closed and/or a first shift element as well as a gear step shift element associated with an odd gear step can be closed. Furthermore, it can be provided that a first shift element and a gear step shift element assigned to an odd gear step are closed to realize the parking lock function and/or that a second shift element and a gear step shift element assigned to an even gear step are closed to realize the parking lock function.

In addition, a dual clutch transmission for a motor vehicle is to be understood as known from DE 199 50 696 A1 describes. The dual clutch transmission has a first transmission input shaft having a starting gear and connected to a first clutch, a second transmission input shaft having a driving gear and connected to a second clutch, and a common transmission output shaft. It is provided that at least one of the transmission input shafts is assigned to several gears, wherein two gears assigned to one of the transmission input shafts can be shifted simultaneously in a parking lock function.

SUMMARY

The object of the present invention is to provide a method for operating a dual clutch transmission of a motor vehicle as well as a motor vehicle, so particularly convenient operation of the motor vehicle can be realized.

A first aspect of the invention relates to a method for operating a dual clutch transmission of a motor vehicle preferably in the form of a motor vehicle, in particular a passenger car. For example, at least one wheel of the motor vehicle, also referred to as a vehicle wheel, can be driven via the dual clutch transmission. In particular, at least or exactly two wheels of the motor vehicle can be driven via the dual clutch transmission, whereby, for example, the motor vehicle as a whole can be driven. This means that the motor vehicle in its fully manufactured state has the dual clutch transmission and the wheel or wheels. The respective wheel is, for example, a ground contact element via which the motor vehicle is supported or can be supported downward on a ground in the upward direction of the vehicle. If the motor vehicle is driven along the ground while the motor vehicle is supported downward on the ground in the upward direction of the vehicle, the wheel rolls on the ground.

The dual clutch transmission has a first partial transmission and a second partial transmission. For example, the dual clutch transmission also comprises a first clutch associated with the first partial transmission and a second clutch associated with the second partial transmission. For example, the motor vehicle has a drive motor by means of which the motor vehicle can be driven via the dual clutch transmission. The drive motor comprises an output shaft in the form of a crankshaft, for example. The feature that the first clutch is assigned to the first partial transmission can in particular be understood to mean that the first partial transmission, in particular a transmission input shaft of the first partial transmission, can be coupled to the output shaft via the first clutch or by means of the first clutch in a torque-transmitting manner, in particular while the second clutch is open. The feature that the second clutch is assigned to the second partial transmission can in particular be understood to mean that the second partial transmission, in particular a second transmission input shaft of the second partial transmission, can be coupled to the output shaft via the second clutch or by means of the second clutch in a torque-transmitting manner, in particular while the first clutch is open. Thus, for example, the motor vehicle can be driven by the drive motor via the dual clutch transmission and in particular via the first partial transmission, while driving of the motor vehicle via the second partial transmission effected by the drive motor is omitted. Furthermore, the motor vehicle can be driven by the drive motor via the dual clutch transmission and thereby via the second partial transmission, while driving of the motor vehicle via the first partial transmission effected by the drive motor is omitted. The respective clutch is preferably designed as a friction clutch, in particular as a multi-plate clutch, whereby a particularly high level of comfort, in particular driving comfort, of the motor vehicle can be realized.

In the method, the dual clutch transmission is, in particular initially, in a parking lock state in which a parking lock or a parking lock function of the dual clutch transmission is activated. In the parking lock state, in particular at least or exactly two gears of one of the partial transmissions are engaged simultaneously. Preferably, in the parking lock state, the clutch associated with the one partial transmission, the two gears of which are engaged simultaneously, is closed. Preferably, it is provided that in the parking lock state, the respective other clutch is open. Alternatively or additionally, it is conceivable that only one gear of the other partial transmission is engaged in the parking lock state. Furthermore, it is conceivable that all gears of the other partial transmission are disengaged in the parking lock state. Preferably, in the parking lock state, the clutches are open at the same time.

As a result of the fact that in the parking lock state, the two gears of the one partial transmission are engaged at the same time and preferably the clutch assigned to the one partial transmission is closed, in particular while the other clutch is open, the dual clutch transmission can be braced or is braced, for example by a slope output force acting on the motor vehicle or by a slope output torque caused by the slope output force, which is introduced into the dual clutch transmission, in particular into one and/or the other partial transmission, for example via a transmission output shaft of the dual clutch transmission.

The dual clutch transmission further comprises a transmission output shaft common to the partial transmissions and drivable by both the first partial transmission and the second partial transmission, which may be, for example, the aforementioned transmission output shaft. By the feature that the transmission output shaft can be driven by the first partial transmission and by the second partial transmission, it can be understood in particular that the transmission output shaft can be coupled or is coupled, for example in a torque-transmitting manner, to a first partial transmission output shaft of the first partial transmission, wherein, for example, the transmission output shaft can be coupled or is coupled in a torque-transmitting manner to a second partial transmission output shaft of the second partial transmission. In particular, the transmission output shaft can be coupled or is coupled to the respective partial transmission output shaft via respective gearwheels in a torque-transmitting manner.

The slope output force and the resulting slope output torque occur, for example, when the motor vehicle is parked on a slope, i.e., on an incline. In this case, the parking lock state can prevent the motor vehicle from rolling away undesirably. Since in the parking lock state, the gears of one partial transmission are engaged at the same time, the one partial transmission is also referred to as a locked partial transmission, and preferably the other partial transmission is referred to as a non-locked partial transmission. Preferably, in the parking lock state, all gears of the other partial transmission are disengaged, or in the parking lock state, at least or exactly one gear of the other partial transmission is engaged.

In order to be able to realize a particularly high level of comfort, in particular driving comfort, of the motor vehicle, i.e., in order to be able to enable particularly comfortable operation of the motor vehicle, it is provided according to the invention that, in order to terminate the parking lock state, at least a first step of the method, also designated with a), and a second step of the method, also designated with b), are carried out, wherein the second step preferably is carried out after the first step. In particular, for example, the second step is performed after the first step is completed. In the first step of the method, a torque caused or provided by a drive element of the motor vehicle is introduced into the one and/or the other partial transmission via the transmission output shaft common to the partial transmissions, while the gears of the one partial transmission are engaged at the same time. For this purpose, for example, the torque provided by the drive element is introduced into the transmission output shaft or transmitted or exerted on the transmission output shaft, wherein the torque introduced into the transmission output shaft is introduced from the transmission output shaft into the one and/or the other partial transmission, i.e., exerted on the one and/or the other partial transmission.

In the second step of the method, at least or exactly one of the gears of the one partial transmission engaged at the same time during the first step is disengaged. Preferably, the second step is carried out after the torque has started to be introduced into the one and/or the other partial transmission and, in particular, while the torque is still being introduced into the one and/or the other partial transmission. By introducing the torque into the one and/or the other partial transmission, the previously described tension of the dual clutch transmission can at least be reduced or eliminated, so that the at least one gear can then be selected without causing an excessive jerk that can be felt, for example, by occupants of the motor vehicle. The method according to the invention thus makes it possible to terminate the parking lock state, i.e., to deploy or deactivate the aforementioned parking lock, without causing an excessive jerk that can be felt by occupants of the motor vehicle.

The dual clutch transmission is preferably an automatic transmission that can engage and disengage its gears automatically. By simultaneously engaging the gears of the one partial transmission, a mechanical parking lock can be implemented. The parking lock or the parking lock state is preferably engaged or activated when the motor vehicle is at a standstill in order to secure the motor vehicle against undesired rolling away independently of the parking brake which is provided, for example, in addition to the dual clutch transmission and thus in addition to the parking lock.

The aforementioned slope output force results from the weight of the motor vehicle. If, for example, the parking lock were to be deactivated by disengaging at least one of the simultaneously engaged gears without the torque being applied to the one and/or the other partial transmission in the manner described above, a strong jerk, also referred to as a relief jerk, could occur if necessary, since the bracing of the dual clutch transmission would be abruptly released. It could also cause unwanted noise. The previously mentioned disadvantages and problems can now be avoided in a particularly advantageous manner by the method according to the invention. The introduction of torque into the one and/or the other partial transmission is also referred to as torque input, which according to the invention takes place in a particularly demand-oriented and space-saving manner via the transmission output shaft assigned to the partial transmissions.

The respective coupling is also referred to as a driving coupling. The slope output torque is a bracing torque which can be reduced or at least cancelled by the torque. This means that the parking lock can be designed without excessive unloading pressure and thus with low noise. In particular, the invention allows the parking lock to be designed to operate on at least virtually all inclines without excessive unloading pressure or disturbing noise. The method can be carried out in a particularly cost-, weight- and space-efficient manner, since, for example, starting from conventional dual clutch transmissions, no further component adaptations are required to implement the method according to the invention. The method according to the invention can be advantageously implemented in particular via an existing actuator control or by means of existing actuators, in particular with regard to engaging and disengaging of gears.

Furthermore, for example, a direction of rotation in which the torque acts can be set in a particularly demand-oriented manner, since according to the invention the torque is not introduced via one of the clutches, but on the output side via the transmission output shaft into the one and/or the other partial transmission. In other words, the transmission output shaft is arranged on an output side or exit side of the dual clutch transmission, since, for example, the dual clutch transmission can provide drive torques for driving the motor vehicle on its output side or exit side via the transmission output shaft. Since, according to the invention, the torque is introduced into the one and/or the other partial transmission via the transmission output shaft and not via one of the drive clutches, the torque is not introduced on the input side but on the output side, i.e., via the output side or from the output side of the dual clutch transmission, into the one and/or the other partial transmission. The invention allows the parking lock to be designed to operate on at least virtually all inclines without unloading pressure or disturbing noise. In addition, the fact that the torque is introduced via the output side of the dual clutch transmission into the dual clutch transmission or into the one and/or the other partial transmission makes it possible to reduce or eliminate the aforementioned tension independently of a driving direction desired by the driver of the motor vehicle, which is derived, for example, from a driving step of the dual clutch transmission selected by the driver. In particular, the introduction of the torque on the output side into the one and/or the other partial transmission can be initiated independently of whether and which of the clutches, if any, is or is being closed, for example, in order to start the motor vehicle after it has come to a standstill during which the parking lock is or was engaged, i.e., in particular, to set it in motion via the said driving step.

It has proved particularly advantageous if an electric machine is used as the drive element. In particular, the electric machine is an electric motor or can be operated as an electric motor, so that the torque can be provided by means of the electric machine in a particularly demand-oriented manner. In particular, by using the electric machine, a direction of rotation in which the torque acts can be set as required, so that, for example, it can be set that the torque acts in a first direction of rotation or in a second direction of rotation opposite to the first direction.

For example, the electric machine is a generator also known as a drive train generator. In other words, the electric machine can be operated, for example, in a generator mode and thus as a generator. In generator mode, the electric machine, in particular its rotor, is driven, for example, by the transmission output shaft and, via the transmission output shaft, by the drive motor, with the generator providing electrical energy as a result of its drive. For example, in order to design the parking lock, the electric machine is operated in a motor mode and thus as an electric motor, by means of which the torque can be exerted on the transmission output shaft and introduced into one and/or the other partial transmission via the transmission output shaft. The generator is located on the output side of the dual clutch transmission. According to the invention, the electric machine thus has a dual function. On the one hand, the electric machine is used as a generator to provide electrical energy. On the other hand, the electric machine is used to introduce the torque into the one and/or the other partial transmission and, as a result, to design the parking lock to be jerk-free and noiseless, or at least with a low jerk and noise level.

Alternatively or additionally, advantageous recuperation can be realized by means of the electric machine, in particular by means of the generator. Here, for example, the wheels of the motor vehicle drive the transmission output shaft, which drives the generator or its stator. This converts kinetic energy of the motor vehicle into electrical energy provided by the generator.

In order to be able to design the parking lock in a particularly convenient manner, in a further embodiment of the invention it is provided that the rotor of the electric machine is arranged coaxially to the transmission output shaft. The electric machine comprises, for example, the mentioned rotor and a stator, wherein the rotor is drivable by the stator and thereby rotatable about a machine rotation axis relative to the stator. Furthermore, it is conceivable that the rotor is arranged axially parallel to the transmission output shaft, so that the axial direction of the transmission output shaft does not coincide with the axial direction of the rotor, but runs parallel to the axial direction of the rotor. Furthermore, it is conceivable that the rotor can be coupled to the transmission output shaft, in particular by means of a coupling device, and decoupled from that of the transmission output shaft.

Another embodiment is distinguished in that the rotor of the electric machine is arranged on the transmission output shaft or on a shaft that is non-rotatably connected to the transmission output shaft and arranged coaxially with the transmission output shaft. As a result, the torque can be introduced into the one and/or the other partial transmission in a particularly space-saving, efficient, and effective manner.

It has been shown to be particularly advantageous if at least the one gear is disengaged in the second step (step b)) while the other gear engaged in the first step (step a)) remains engaged. This means that the parking lock can be designed, i.e., deactivated, particularly conveniently and quickly.

In order to realize a particularly high comfort of the motor vehicle, it is provided in a further embodiment of the invention that the method is carried out when the motor vehicle is stationary. Thus, it is preferably provided that at least steps a) and b) are carried out when the motor vehicle is at a standstill.

In order to be able to achieve a particularly high level of driving comfort, a further embodiment of the invention provides that the other gear that is engaged or remains engaged during the second step is used to start the motor vehicle after it has come to a standstill and ended the parking lock state. As a result, an at least almost seamless transition from the stationary state to the starting state, which cannot be felt by the occupants of the motor vehicle, can be realized, wherein the parking lock state can be terminated without excessive unloading pressure. By this is meant that the other gear is used for starting, in particular that the motor vehicle is driven by the drive motor via the other gear and thereby started, in particular while the or all other gears of the dual clutch transmission are disengaged.

In order to be able to implement the method in a particularly simple, cost-effective and convenient manner, it is provided in a further embodiment of the invention that, for starting the motor vehicle, the motor vehicle is driven by means of the drive motor provided in addition to the drive element. In other words, for example, the drive element is a first component of the motor vehicle, and the drive motor is a second component provided in addition to the first component and external with respect to the first component. The drive motor is preferably an internal combustion engine the output shaft of which can preferably be designed as a crankshaft. Thus, the internal combustion engine is, for example, a reciprocating engine. In particular, the drive motor and thus its output shaft are arranged on an input side of the dual clutch transmission opposite the output side, via the input side of which the drive torques that can be provided by the drive motor can be introduced into the dual clutch transmission, in particular into the respective transmission input shaft.

It has also been shown to be particularly advantageous if the torque is provided and introduced into the one and/or the other partial transmission in such a way that movement of the motor vehicle in the longitudinal direction of the vehicle caused by the provision and introduction of the torque is prevented. This can prevent excessive movement of the motor vehicle caused by the torque that is unexpected by occupants of the motor vehicle, for example, so that the parking lock can be designed to be particularly convenient without this being noticed by the occupants of the motor vehicle.

In order to be able to deactivate the parking lock function in a particularly convenient manner, it is provided in a further embodiment of the invention that the torque is provided and introduced into the one and/or the other partial transmission in such a way that the torque counteracts the aforementioned slope output torque caused by the slope output force acting on the motor vehicle and introduced into the one and/or the other partial transmission. As a result, the tension of the dual clutch transmission, in particular of the one partial transmission, can at least be reduced or eliminated before the at least one gear is disengaged. After reducing or releasing the tension, the at least one gear is disengaged, whereby the parking lock is deactivated in a particularly convenient way.

In order to avoid unexpected behavior of the motor vehicle and consequently to be able to ensure a particularly high level of comfort, in a further embodiment of the invention it is provided that in the second step both, in particular all, gears of one partial transmission are disengaged, the clutch associated with one partial transmission is opened, at least or exactly one gear of the other partial transmission is engaged and the clutch associated with the other partial transmission is closed. Thereupon, for example, the motor vehicle can be driven by the drive motor via the other partial transmission and, in particular, via the engaged gear of the other partial transmission and thus for example started up without any unexpected and uncomfortable behavior or movement of the motor vehicle and without any excessive unloading pressure.

Preferably, it is provided that the torque is set, i.e., introduced into the one and/or the other partial transmission, in such a way that the introduced torque counteracts the bracing torque resulting from the slope output force. For this purpose, for example, an advantageous gear, in particular a starting gear, is engaged on the other, non-locked partial transmission. The amount or magnitude of the torque is preferably selected so that the torque ideally corresponds exactly to the bracing torque. If, for example, a direction of travel desired by the driver of the motor vehicle does not correspond to the clutch assigned to one partial transmission, i.e., if, for example, travel or starting of the motor vehicle in a direction desired by the driver of the motor vehicle cannot be effected via the clutch assigned to one partial transmission, it is advantageous to avoid the torque being significantly higher than the bracing torque in order to avoid movement or travel of the motor vehicle in a direction opposite to the direction desired by the driver. For example, as soon as the torque is introduced into the one and/or the other partial transmission and the bracing torque is removed or reduced in such a way that the bracing torque is, for example, greater than zero and falls below a threshold value, the at least one gear of the one partial transmission, also referred to as a locking gear, can be disengaged. This deactivates the parking lock without causing excessive unloading pressure.

A second aspect of the invention relates to a motor vehicle preferably in the form of a motor vehicle, in particular a passenger vehicle, which is adapted to carry out a method according to the invention in accordance with the first aspect of the invention. Advantages and advantageous embodiments of the first aspect of the invention are to be considered advantages and advantageous embodiments of the second aspect of the invention, and vice versa.

The invention also includes further embodiments of the motor vehicle according to the invention which have features as already described in connection with the further embodiments of the method according to the invention. For this reason, the corresponding further embodiments of the motor vehicle according to the invention are not described again here.

The motor vehicle according to the invention is preferably designed as a motor vehicle, in particular as a passenger car or truck, or as a passenger bus or motorcycle.

The invention also includes combinations of the features of the described embodiments.

BRIEF DESCRIPTION OF THE FIGURE

An exemplary embodiment of the invention is described below. For this purpose, the only FIGURE shows a schematic representation of a dual clutch transmission of a motor vehicle, wherein the dual clutch transmission is operated according to a method according to the invention.

DETAILED DESCRIPTION OF THE FIGURE

The embodiment explained below is a preferred exemplary embodiment of the invention. In the exemplary embodiment, the described components of the embodiment each represent individual features of the invention that are to be considered independently of one another, and which also each independently further develop the invention. Therefore, the disclosure is intended to include combinations of the features of the embodiment other than those shown. Furthermore, the described embodiment can also be supplemented by further of the already described features of the invention.

The only FIG. shows in a schematic representation a dual clutch transmission 10 of a motor vehicle, which is preferably designed as a motor vehicle or preferably as a passenger car. The motor vehicle has at least one drive motor 12 by means of which at least two wheels of the motor vehicle can be driven via the dual clutch transmission 10. By driving the wheels, the motor vehicle as a whole can be driven. The wheels are ground contact elements by means of which the motor vehicle can be supported or braced against a floor in the upward direction of the vehicle. The wheels are also called vehicle wheels and roll on the ground when the motor vehicle is driven along the ground, while it is supported via the wheels downward on the ground in the upward direction of the vehicle. The drive motor 12 is preferably an internal combustion engine designed, for example, as a reciprocating engine, which has an output shaft 14 designed, for example, as a crankshaft. Via the output shaft 14, the drive motor 12 can provide drive torques, which are also referred to as input torques. By means of the drive torques, the wheels can be driven via the dual clutch transmission 10, allowing the motor vehicle to be driven as a whole.

The dual clutch transmission 10 includes a first partial transmission 16 that includes, for example, three first gears 18a-c. In addition, the first partial transmission 16 includes a first transmission input shaft 20. The dual clutch transmission 10 further includes a second partial transmission 22 having a second transmission input shaft 24 and second gears 26a-c. For example, the gears 18a-c are odd gears or are also referred to as odd gears, wherein, for example, the gear 18a may be the so-called first gear, the gear 18b may be the so-called third gear, and the gear 18c may be the so-called fifth gear of the dual clutch transmission 10. For example, the gears 26a-c are also referred to as straight gears or are so-called straight gears of the dual clutch transmission 10, where, for example, the gear 26a may be the second gear, the gear 26b may be the fourth gear, and the gear 26c may be the sixth gear of the dual clutch transmission 10.

In this context, the dual clutch transmission 10 has also a first clutch 28 which is assigned to the partial transmission 16 and which is assigned, for example with respect to the partial transmissions 16 and 22, in particular with respect to the transmission input shafts 20 and 24, exclusively to the partial transmission 16 or exclusively to the transmission input shaft 20, but not to the partial transmission 22 and not to the transmission input shaft 24. The dual clutch transmission 10 further comprises a second clutch 30 which is assigned to the partial transmission 22 and which, for example with respect to the partial transmissions 16 and 22, in particular with respect to the transmission input shafts 20 and 24, is assigned exclusively to the partial transmission 22 or exclusively to the transmission input shaft 24, but not to the partial transmission 16 or not to the transmission input shaft 20. This means that, with respect to the transmission input shafts 20 and 24, only the transmission input shaft 20 can be connected or coupled to the output shaft 14 by means of the coupling 28 in a torque-transmitting manner. By means of the coupling 30, only the transmission input shaft 24 can be connected or coupled to the output shaft 14 in a torque-transmitting manner with respect to the transmission input shafts 20 and 24. In addition, the transmission input shaft 24 is designed as a hollow shaft, which in the present case is penetrated at least partially, in particular at least predominantly or completely, by the transmission input shaft 20, which is designed, for example, as a solid shaft. The respective partial transmission 16 or 22 also has a respective side shaft 32 or 34. The side shaft 32 is a first partial transmission output shaft of the partial transmission 16, as the partial transmission 16 can provide drive torques to drive the wheels via its first partial transmission output shaft. The side shaft 34 is a second partial transmission output shaft of the partial transmission 22, as the partial transmission 22 can provide torque to drive the wheels via its second partial transmission output shaft.

Furthermore, the dual clutch transmission 10 has a transmission output shaft 36 common to the partial transmissions 16 and 20, in particular the side shafts 32 and 34, which can be driven by the side shafts 32 and 34 and thus by both partial transmissions 16 and 22. For this purpose, the transmission output shaft 36 is coupled to the side shafts 32 and 34 via respective gearwheels or gearwheel pairs in a torque-transmitting manner, in particular simultaneously. Overall, it can be seen that the transmission output shaft 36 is arranged on an output side, also referred to as the exit side, of the dual clutch transmission 10, since the dual clutch transmission 10 as a whole can provide input torques for driving the wheels via the transmission output shaft 36 and thus on the output side.

The drive motor 12 can provide at least one drive torque via its output shaft 14, which can be introduced into the respective partial transmission 16 or 22 via the respective clutch 28 or 30 and can be transmitted to the transmission output shaft 36 via this. In this way, the aforementioned wheels can be driven by the drive motor 12 via the dual clutch transmission 10. Preferably, when the coupling 28 is closed, the coupling 30 is provided to be open. It is also preferred that when the coupling 30 is closed, the coupling 28 is open. Thus, preferably only one of the partial transmissions 16 and 22 is connected to the output shaft 14 via the respective coupling 28 or 30 in a torque-transmitting manner.

A method for operating the dual clutch transmission 10 is described below. In the method, the dual clutch transmission 10 is at least temporarily in a parking lock state in which, for example, the gears 18a and 18b of the partial transmission 16 are engaged simultaneously and preferably the clutch 28 is closed. Preferably, in the parking lock state, the clutch 30 is open and/or preferably, in the parking lock state, the or all gears 26a-c of the partial transmission 22 are disengaged. In addition, it is preferably provided that, except for the two engaged gears 18a and 18b, all other gears of the partial transmission 16 are disengaged. In the parking lock state, a mechanical parking lock is activated or realized, which can be used to prevent the vehicle from rolling away, especially when it is parked on a slope. In particular, when the motor vehicle is parked on the or a slope, a slope output force resulting from the weight of the motor vehicle acts on the motor vehicle. This slope output force results in a slope output torque which, for example in the parking lock state, is introduced via the wheels and the transmission output shaft 36 into the dual clutch transmission 10, in particular into the partial transmission 16, and thus acts on the dual clutch transmission 10, in particular on the partial transmission 16. Since, for example, the gears 18a, b are engaged at the same time, the partial transmission 16 is braced. In other words, the slope output torque acts as a bracing torque by which the partial transmission 16 is braced. This realizes and activates the aforementioned mechanical parking lock.

In order to be able to realize a particularly convenient operation of the motor vehicle, in order to end the parking lock state in a first step of the method, a torque produced or provided by a drive element 38 of the motor vehicle is exerted on the transmission output shaft 36 and is subsequently introduced via the transmission output shaft 36 into the locked partial transmission 16 and, if applicable, into the partial transmission 22, while the gears 18a, b of the partial transmission 16 are engaged and preferably the clutch 28 assigned to the partial transmission 16 is closed. In a second step of the method, at least one of the gears 18a, b of the partial transmission 16 engaged in the first step is disengaged—in particular after the introduction of the torque into the partial transmission 16 has begun and preferably while the torque is being introduced into the partial transmission 16—while or wherein, for example, disengagement of the respective other gear 18b or 18a is omitted. In this case, the torque is for example provided and introduced in the partial transmission 16 or 22 in such a way that the torque counteracts the slope output torque. This at least reduces or eliminates the slope output torque. In other words, this at least reduces or eliminates the previously described tension on the partial transmission 16, so that the at least one gear 18a or 18b can be designed without causing excessive jerk, also referred to as unloading jerk. For example, in the embodiment shown in the FIG., the at least one gear that is designed in the second step is gear 18a. By disengaging the at least one gear 18a or 18b, the mechanical parking lock is deactivated, i.e., disengaged. Since the tension of the partial transmission 16 is or was at least reduced or removed beforehand, the parking lock can be deactivated without causing a jerk that can be perceived by occupants in the passenger compartment of the motor vehicle. It is further preferred that the torque is provided and introduced into the partial transmission 16 or 22 in such a way that a movement of the motor vehicle in the longitudinal direction of the vehicle caused by the provision and introduction of the torque is prevented.

It can be seen from FIG. that the drive element 38 is a component provided in addition to the drive motor 12 and external with respect to the drive motor 12. While the drive motor 12 is arranged on the input side of the double clutch transmission 10, since the drive torques provided by the drive motor 12 via the output shaft 14 can be introduced into the double clutch transmission 10 on or via an input side of the double clutch transmission 10 and thereby onto the respective transmission input shaft 20 or 24, the drive element 38 is arranged on the output side of the double clutch transmission 10, i.e., on the aforementioned output side or exit side of the double clutch transmission 10.

In the embodiment shown in the FIG., the drive element 38 is an electric machine, which includes a stator 40 and a rotor 42. The rotor 42 is drivable by the stator 40 and thereby rotatable about a machine axis of rotation, particularly relative to a housing of the dual clutch transmission 10 not shown in the FIG. Here, the transmission input shafts 20 and 24 and the side shafts 32 and 34 are each at least partially arranged in said housing. In this regard, the transmission output shaft 36 is rotatable about an axis of rotation relative to the housing.

In the embodiment shown in the FIG. the machine rotation axis coincides with the rotation axis so that the drive element 38, in particular the rotor 42, is arranged coaxially with the transmission output shaft 36. In addition, the rotor 42 is disposed on the transmission output shaft 36. In particular, it is conceivable that the rotor 42 is couplable or coupled to the transmission output shaft 36 in a torque transmitting manner. In particular, it is conceivable that the rotor 42 is non-rotatably connected to the transmission output shaft 36.

For example, in the second step, the gear 18a is disengaged while the other gear 18b engaged in the first step remains engaged. The first step and the second step are performed, for example, while the motor vehicle is stationary. In this context, it has been shown to be particularly advantageous if the other gear 18b, which remains engaged during the second step, is used for a start-up of the motor vehicle following the standstill and the termination of the parking lock state.

Furthermore, it is conceivable that both gears 18a and 18b are disengaged during the second step. In addition, for example, the clutch 28 associated with the partial transmission 16 is opened. In addition, for example, at least or exactly one of the gears 26a-c of the partial transmission 22 is engaged, and the clutch 30 associated with the other partial transmission 22 is closed. Then, for example, the one gear 26a, b, and c, respectively, of the partial transmission 22 is used to drive and eventually start the motor vehicle. This driving and starting of the motor vehicle, in particular via the one engaged gear 26a, b or c and the associated clutch 30, takes place, for example, by means of the drive motor 12.

Overall, it can be seen that the parking lock described above can be implemented in a particularly space-saving, weight-saving and cost-effective manner, since the gears 18a, b that are used anyway are used to implement the mechanical parking lock. In addition, the method makes it possible to deactivate the parking lock conveniently and thus quietly, in particular noiselessly, since the torque is introduced into the partial transmission 16 or 22 beforehand.

The drive element 38, preferably in the form of an electric machine, can provide the torque, in particular as a drive torque, using electrical energy or electrical current. Thus, the electric machine provides the torque to unlock the partial transmission 16. The electric machine, in particular the rotor 42, can be connected or is connected with the transmission output shaft 36 in a rotationally fixed manner, for example, so that the drive element 38 can exert the torque, in particular directly, on the transmission output shaft 36. It is conceivable that the rotor 42 can be driven and thus rotated by the stator 40 about the axis of rotation of the machine in a first direction of rotation and in a second direction of rotation opposite to the first direction of rotation. Thus, for example, the electric machine can selectively rotate its rotor 42 and thus the transmission output shaft 36 in the first direction of rotation and in the second direction of rotation, so that the electric machine can selectively provide the torque in the first direction of rotation or in the second direction of rotation or apply the torque to the transmission output shaft 36, to unlock the partial transmission 16.

The gears 18a, b are also referred to as blocking gears. It is conceivable that the locking gears can be activated, i.e., engaged and disengaged, independently of each other.

The invention claimed is:

1. A method for operating a dual clutch transmission of a motor vehicle having a first partial transmission, a second partial transmission, and a transmission output shaft which is common to the first partial transmissions and configured to be driven by both the first partial transmission and the second partial transmission, in which the dual clutch transmission is in a parking lock state in which first and second gears of one of the partial transmissions are engaged simultaneously, wherein
   to exit the parking lock state, the following steps must be performed:
   a) introducing a torque caused by a drive element of the motor vehicle via the transmission output shaft into the first partial transmission and the second partial transmission while the gears of the first partial transmission are engaged; and
   b) disengaging at least one gear of the first partial transmission engaged simultaneously in step a).

2. The method according to claim 1, wherein an electric machine is used as the drive element.

3. The method according to claim 1, wherein in step b), the first gear is disengaged while the second other gear engaged in step a) remains engaged.

4. The method according to claim 1, wherein the method is carried out with the motor vehicle at a standstill.

5. The method according to claim 4, wherein the second gear which remains engaged in step b) is used for a start-up of the motor vehicle following the standstill and termination of the parking lock state.

6. The method according to claim 5, wherein, for starting the motor vehicle, the motor vehicle is driven by a drive motor provided in addition to the drive element.

7. The method according to claim 1, wherein the torque is provided and introduced into the first partial transmission and the second partial transmission in such a way that a movement of the motor vehicle in a longitudinal direction of the vehicle caused by provision and introduction of the torque is prevented.

8. The method according to claim 1, wherein the torque is provided and introduced into the first partial transmission and the second partial transmission in such a way that the torque counteracts a slope output torque caused by a slope output force acting on the motor vehicle and introduced into the first partial transmission and the second partial transmission.

9. The method according to claim 1, wherein in step b) both gears of the first partial transmission are disengaged, a clutch associated with the first partial transmission is opened, a gear of the second partial transmission is engaged, and a clutch associated with the second partial transmission is closed.

10. The method according to claim 1, wherein in step b), the first gear is disengaged while the second gear engaged in step a) remains engaged.

11. The method according to claim 2, wherein the method is carried out with the motor vehicle at a standstill.

12. The method according to claim 3, wherein the method is carried out with the motor vehicle at a standstill.

13. The method according to claim 4, wherein the second gear which remains engaged in step b) is used for a start-up of the motor vehicle following the standstill and a termination of the parking lock state.

14. The method according to claim 2, wherein the torque is provided and introduced into the first partial transmission and the second partial transmission in such a way that a movement of the motor vehicle in a longitudinal direction of the vehicle caused by provision and introduction of the torque is prevented.

15. The method according to claim 4, wherein the torque is provided and introduced into the first partial transmission and the second partial transmission in such a way that a movement of the motor vehicle in a longitudinal direction of the vehicle caused by provision and introduction of the torque is prevented.

16. The method according to claim 5, wherein the torque is provided and introduced into the first partial transmission and the second partial transmission in such a way that a movement of the motor vehicle in a longitudinal direction of the vehicle caused by provision and introduction of the torque is prevented.

17. The method according to claim 6, wherein the torque is provided and introduced into the first partial transmission and the second partial transmission in such a way that a movement of the motor vehicle in a longitudinal direction of the vehicle caused by provision and introduction of the torque is prevented.

18. The method according to claim 7, wherein the torque is provided and introduced into the first partial transmission and the second partial transmission in such a way that a movement of the motor vehicle in a longitudinal direction of the vehicle caused by provision and introduction of the torque is prevented.

19. The method according to claim 2, wherein the torque is provided and introduced into the first partial transmission and the second partial transmission in such a way that the torque counteracts a slope output torque caused by a slope output force acting on the motor vehicle and introduced into the first partial transmission and the second partial transmission.

20. The method according to claim 3, wherein the torque is provided and introduced into the first partial transmission and the second partial transmission in such a way that the torque counteracts a slope output torque caused by a slope output force acting on the motor vehicle and introduced into the first partial transmission and the second partial transmission.

* * * * *